United States Patent
Lule

(10) Patent No.: US 7,679,849 B2
(45) Date of Patent: Mar. 16, 2010

(54) MOBILE LENS UNIT WITH DETECTION DEVICE

(75) Inventor: Tarek Lule, Saint Egreve (FR)

(73) Assignee: STMicroelectronics (Grenoble) SAS, Grenoble (FR)

( * ) Notice: Subject to any disclaimer, the term of this patent is extended or adjusted under 35 U.S.C. 154(b) by 0 days.

(21) Appl. No.: 12/129,703

(22) Filed: May 30, 2008

(65) Prior Publication Data
US 2008/0297922 A1 Dec. 4, 2008

(30) Foreign Application Priority Data
Jun. 1, 2007 (FR) .................................. 07/55412

(51) Int. Cl.
*G02B 7/02* (2006.01)
*G02B 15/14* (2006.01)
*G02B 21/00* (2006.01)

(52) U.S. Cl. ................ 359/824; 359/823; 359/379; 359/383; 359/698; 348/345

(58) Field of Classification Search ............ 359/820, 359/823, 824, 826, 379–383, 694–698; 348/345, 348/347, 357, 360; 396/133
See application file for complete search history.

(56) References Cited

U.S. PATENT DOCUMENTS

| 2,782,683 | A | * | 2/1957 | Walker .................. 359/698 |
| 4,120,200 | A | * | 10/1978 | Braun .................... 374/129 |
| 4,831,402 | A | * | 5/1989 | Fujita et al. ............. 396/76 |
| 4,867,574 | A | * | 9/1989 | Jenkofsky ............... 374/121 |
| 5,111,230 | A |   | 5/1992 | Kobayashi |
| 5,137,349 | A | * | 8/1992 | Taniguchi et al. ........ 353/122 |
| 5,383,060 | A | * | 1/1995 | Davis ..................... 359/820 |
| 6,909,540 | B2 | * | 6/2005 | Engelhardt et al. ...... 359/379 |
| 6,954,292 | B2 | * | 10/2005 | Inoue ..................... 358/475 |
| 7,408,728 | B2 | * | 8/2008 | Bloch et al. ............. 359/820 |
| 2006/0061442 | A1 |   | 3/2006 | Brooks |
| 2007/0046109 | A1 |   | 3/2007 | Ho et al. |
| 2007/0047942 | A1 |   | 3/2007 | Chang et al. |

FOREIGN PATENT DOCUMENTS

| EP | 0459889 A2 | 12/1991 |
| EP | 0485302 A2 | 5/1992 |
| EP | 0694799 A2 | 1/1996 |

OTHER PUBLICATIONS

French Search Report from corresponding French Application No. 07/55412, filed Jun. 1, 2007. The search was completed on Nov. 19, 2007.

* cited by examiner

*Primary Examiner*—Loha Ben
(74) *Attorney, Agent, or Firm*—Lisa K. Jorgenson; James H. Morris; Wolf, Greenfield & Sacks, P.C.

(57) ABSTRACT

A lens unit includes a lens barrel for receiving at least one lens and a motor arranged to displace the lens barrel between various positions. Displacement of the lens barrel is proportional to an electrical signal applied to the motor. A first conductor is fixed to the lens barrel and is arranged to make electrical contact with a second conductor when the lens barrel is at an initial position. A processor is arranged to detect a change in the electrical contact, to determine an electrical signal at the time of the change and to generate an electrical signal corresponding to the desired displacement.

14 Claims, 3 Drawing Sheets

MOBILE LENS UNIT WITH DETECTION DEVICE

FIELD

Aspects relate to a mobile lens unit and, in particular, to a mobile lens unit comprising a detection device for detecting the position of a lens within the lens unit.

BACKGROUND

FIG. 1 illustrates schematically, in cross-section, a mobile lens unit 100 comprising a cylindrical lens barrel 102 with a number of fixed lenses 104, 106 and 108 mounted therein, the lens barrel 102 having a conducting coil 110 mounted within its walls. The coil 110 is formed of a wire represented in cross-section by small circles with dots to represent a current flow one way in the wire, and crosses to represent a current flow in the opposite direct. Mobile lens unit 100 also comprises a housing 112, which is, for example, formed of plastic, and has rims 113, 114 at the top and bottom respectively, which extend some way towards the center of the housing, and act as stoppers for the lens barrel 102. A permanent magnet 115, which is for example also cylindrical, is mounted against the inner surface of the housing 112 and lies adjacent to the lens barrel 102. The coil 110, and the permanent magnet 115 together form a voice coil motor (VCM). Springs 116 and 118 are connected between the housing 112 and the lens barrel 102.

In operation, the mobile lens unit 100 is mounted over an image sensor (not shown), and the positioning of the lenses with respect to the image sensor can be adjusted by moving the lens barrel 102 up and down within the housing, which can be achieved by passing a current through the coil 110. Springs 116, 118 hold the lens barrel 102 at an initial position at the bottom end of the housing resting against rim 113 when no current is applied to the coil. When current is applied to the coil, due to electromagnetic force generated by the current flow in a magnetic field, the lens barrel moves towards the top of the housing, counteracting the force of the springs 116, 118. Springs 116, 118 have an increasing restoring force the further the lens barrel is from its initial start position, meaning that the lens barrel rests at a particular position depending on the current level applied to the coil.

A problem with the mobile lens unit 100 of FIG. 1 is that it can be very difficult to estimate the required current level to move the lens barrel to a determined lens position. This is because the current level for a given lens position depends on various factors, such as the orientation of the mobile lens unit with respect to gravity, the strength of the springs holding the lens barrel, the force of the springs at the initial position of the lens barrel and any friction in the system. Thus the same current may result in different lens positions on different occasions.

A proposed solution to this problem is to use a feedback loop attached to a position sensor, for example, formed of a laser or LED and a light detector fitted within the mobile lens unit, and designed to detect the position of the lens barrel within the housing. However, such systems are disadvantageous as they require relatively bulky components and additional circuitry, which is not compatible with most lens unit designs in which space is very limited, and the components are relatively high cost.

SUMMARY

According to one aspect there is provided a lens unit comprising a lens barrel for receiving at least one lens; a motor arranged to displace the lens barrel between an initial position and a maximum displacement, wherein the displacement of a lens barrel is proportional to the level of an electrical signal applied to the motor when the electrical signal is between first and second levels, the first level corresponding to a level for starting movement of the lens barrel from the initial position and the second level corresponding to a level for bringing the lens barrel to the maximum displacement; a first conductor fixed to the lens barrel and arranged to make electrical contact with a second conductor when said lens barrel is at one of said initial position and said maximum displacement; and a processor arranged to detect a change in the contact situation between the first and second conductive surfaces, to determine one of said first and second levels based on level of the electrical signal at the time of the change and to generate, based on said determined level, a level of said electrical signal for a desired displacement.

According to an embodiment, the first conductor is positioned to make contact with said second conductor when said lens barrel is at said initial position and said processor is arranged to determine said first level of said electrical signal when the contact between said first and second conductors is broken.

According to another embodiment, the lens unit further comprises a third conductor fixed to the lens barrel and arranged to make electrical contact with a fourth conductor when said lens barrel is at said maximum displacement, and wherein said processor is arranged to determine a second level of the electrical signal applied to said motor when contact is made between said third and fourth conductors, and to adjust said second level to generate said electrical signal to be applied to said motor.

According to another embodiment, the at least one of said first and second conductors comprises a pointed surface for making contact with the other of said first and second conductors.

According to another embodiment, the motor comprises a conducting coil and a magnet, and said lens unit further comprises first and second springs connected to said lens barrel and arranged to hold said lens barrel at said initial position when no current flows in said coil, each of said first and second springs electrically connected to said coil for supplying said current, and one of said first and second springs connected to said first conductor.

According to another embodiment, the level of said electrical signal is a current level.

According to another aspect there is provided a device comprising the above lens unit, an image sensor for capturing images received via said lens unit, a memory for storing images captured by said image sensor and an auto-focus block for generating a focus control signal, wherein said processor is arranged to provide a drive signal to said lens unit based on said focus control signal.

According to another embodiment, the processor is integrated in at least one of: the auto-focus block; and the image sensor.

According to another embodiment, the device comprises a non-volatile memory storing characteristic data relating to the lens unit, said data for use by said processor in controlling said lens unit.

According to another aspect there is provided a mobile telephone, digital camera or personal digital assistant comprising the above device.

According to yet another aspect, there is provided a method of determining a level of an electrical signal to be applied to a motor to move a lens barrel to a certain position, wherein the displacement of the lens barrel is proportional to the level of an electrical signal applied to the motor when the electrical signal is between first and second levels, the first level corresponding to a level for starting movement of the lens barrel from the initial position and the second level corresponding to a level for bringing the lens barrel to the maximum displacement, and wherein a first conductor is fixed to the lens barrel and arranged to make electrical contact with a second conductor when said lens barrel is at one of an initial position and a maximum displacement, the method comprising: increasing the level of an electrical signal applied to said motor; detecting a change in said contact situation between said first and second conductors and determining one of the first or second levels based on the level of the electrical signal at the time the change; and generating said level of said electrical signal to be applied to said motor for a desired displacement based on the determined level of said electrical signal.

According to another embodiment, the first and second conductors are arranged to make electrical contact when said lens barrel is at said initial position, and wherein said change in said contact situation is a breaking of the connection between said first and second conductors.

BRIEF DESCRIPTION OF THE DRAWINGS

The foregoing and other purposes, features and advantages will become apparent from the following detailed description of embodiments, given by way of illustration and not limitation with reference to the accompanying drawings, in which.

DETAILED DESCRIPTION

Throughout the present description, terms such as "top", "bottom", "upwards", "downwards", "towards the top", "towards the bottom", "horizontally" and "vertically", which depend on the particular orientation of the lens apparatus, will be assumed to apply when the lens apparatus is orientated as shown in the figures.

Figure 1:
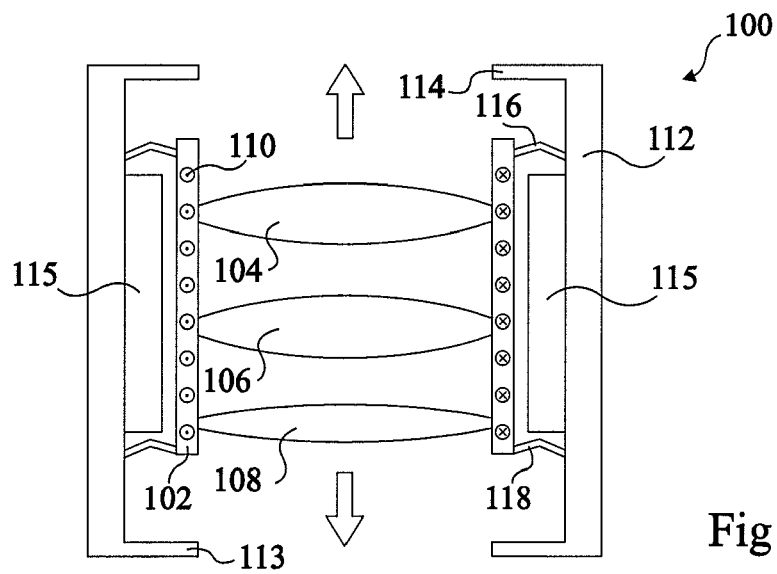
FIG. 1 (described above) illustrates schematically in cross-section an example of a mobile lens unit comprising a VCM.
Figure 2A:
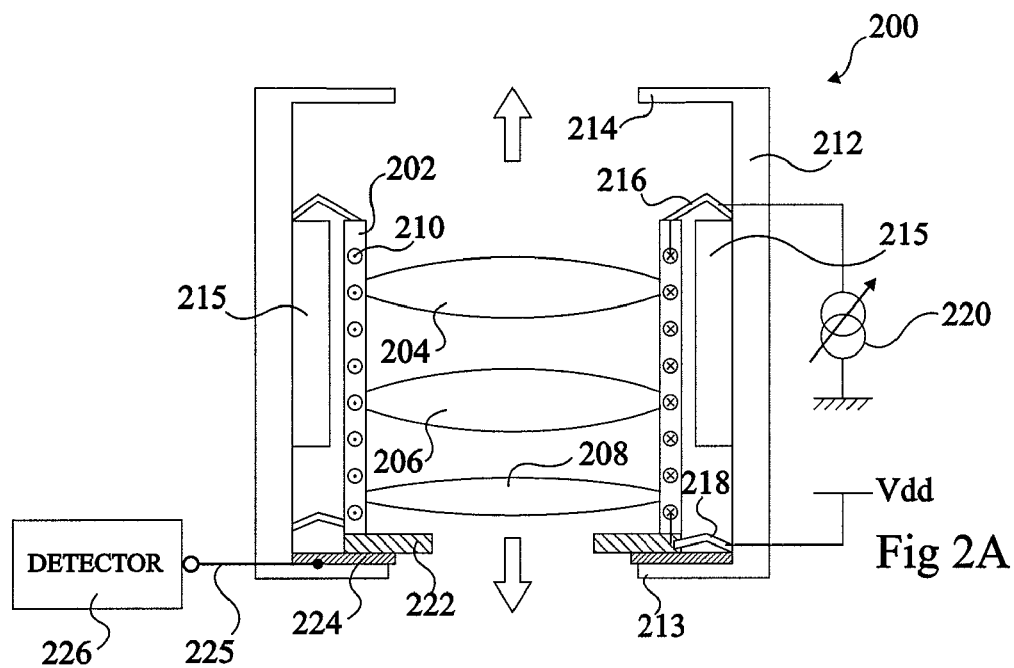
FIGS. 2A and 2B illustrate schematically in cross-section and plan view respectively an example of a mobile lens unit according to an embodiment.

With reference to FIG. 2A, a mobile lens unit 200 is illustrated schematically in cross-section. Mobile lens unit 200 comprises a lens barrel 202, which is preferably cylindrical in shape, and in which a number of fixed lens 204, 206 and 208 are mounted, where the number depends on optical requirements. One or more liquid lenses could alternatively or additionally be mounted in the lens barrel, liquid lenses comprising a refractive interface movable by electrowetting or other means.

The lens barrel 202 comprises a coil 210 formed of conducting wire running along or through the walls of the lens barrel. The mobile lens unit 200 further comprises a housing 212, which is substantially cylindrical in shape in this example, but could be other shapes, and has rims 213, 214 at the top and bottom respectively, which extend some way towards the center of the housing, and act as stoppers for the lens barrel 202.

A permanent magnet 215, which is, for example, cylindrical, is mounted on the inside surface of the housing 212, adjacent to the lens barrel 202. Alternatively a plurality of permanent magnets could be provided spaced around the inside surface of the housing. Springs 216 and 218 are connected to the top and bottom of the lens barrel 202. Springs 216 and 218 function to both hold the lend barrel 212 at the bottom of the housing 212 when no current is applied to the coil 210, and in this example also provide an electrical connection via which a current can be applied to the coil. In particular, spring 216 is connected to an uppermost end of the coil 210, whilst spring 218 is connected to a lower end of the coil 210. In this example, spring 218 is connected to a supply voltage Vdd, while spring 216 is connected to a variable current source 220, which can provide a variable current through the coil, and which is connected to ground. Current source 220, for example, comprises one or more MOS transistors.

FIG. 2A illustrates the lens barrel 202 positioned at the lowest possible point within the housing 212, and contacting bottom rim 213 of the housing 212. From here, by applying a current to the coil, the lens barrel 202 can move upwards in the housing 212, to a maximum displacement when it is touching the upper rim 214 of the housing 212.

An electrically conductive ring 222 is fixed to the bottom edge of the lens barrel 202. Conductive ring 222 is also connected to spring 218. The housing comprises an electrically conductive ring 224 arranged on the upper edge of the bottom rim. When the lens barrel 202 is positioned at the lowest point within the housing 212, as shown in FIG. 2A, conductive rings 222 and 224 make electrical contact with each other. Conductive ring 224 is connected by a conductor 225 to a sensing device 226 for detecting a voltage. Conductive ring 224 will receive the supply voltage Vdd applied to spring 218 when the lens barrel is in the position in contact with the bottom of the housing as shown in FIG. 2A. When the lens barrel moves upwards away from the bottom rim 213 of the housing 212, contact between the conductive rings 222 and 224 will be interrupted, and the sensing device 226 will no longer detect a voltage. Accordingly, the voltage on conductive ring 224 is used to indicate when the current in the coil 210 is sufficiently high to displace the lens barrel 202.

Figure 5:
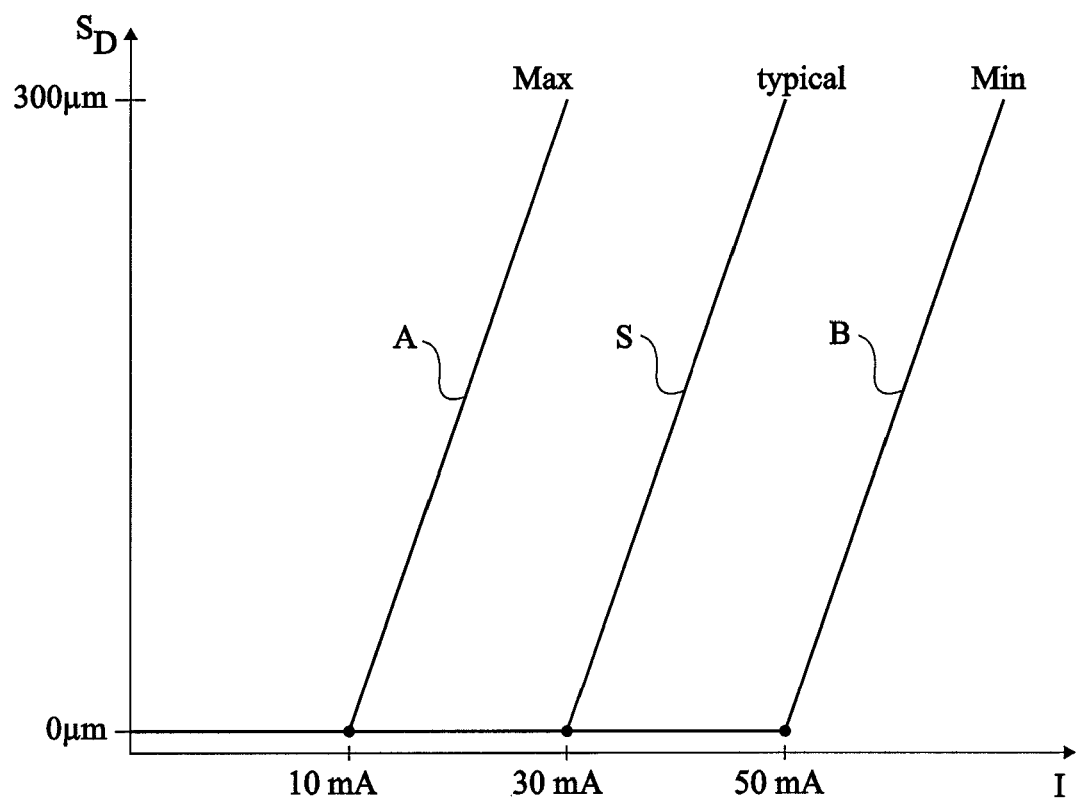
FIG. 5 is a graph illustrating an example of displacement against current for a VCM.

Reference will be made to FIG. 5, which is a graph showing examples of the displacement of the lens barrel 202 with the respect to the current flowing in the coil. A typical curve S is shown in the center. In this example, a current of 30 mA is needed to start the displacement of the lens barrel, and the lens barrel reaches its maximum displacement, for example equal to 300 μm, when approximately 53 mA of current is applied. However, the displacement could start at a lower current, for example of 10 mA, as represented by the curve maximum A, or for at a higher current, for example 50 mA, as represented by the curve minimum B. The displacement could follow any intermediate curve between the curves A and B, depending on factors such as gravity, friction etc. The inventor has found that, in all cases, the curves are substantially straight with substantially equal gradients, and thus by knowing the starting current, the current needed for all positions on the curve can be calculated.

The circuitry in FIG. 2A allows the current level at which movement of the lens barrel starts to be determined. In particular, as soon as the lens barrel starts moving, the connection between conductive rings 222 and 224 is broken, and this can be detected by detector 226. The current is preferably increased in a ramp until movement of the lens barrel is detected, and the current level that has been reached is stored.

The current I for a given lens barrel displacement is preferably calculated using the following formula:

$$I = I_S + S_D \cdot R_{I/S} \qquad (1)$$

where $I_S$ is the determined start current, $S_D$ is the desired displacement of the lens barrel from the initial position, and $R_{I/S}$ is the ratio of current to displacement, in other words the current required per unit of displacement. The ratio $R_{I/S}$ is for example known and stored in a register or a non-volatile memory. As an example, if the ratio of current per unit displacement is equal to 100 mA/mm, the required displacement is 60 µm, and the initial current is 25 mA, then the current I can be determined as 25+100×0.06=31 mA. This value can for example be provided in the form of a voltage signal to control current source 220.

Figure 2B:
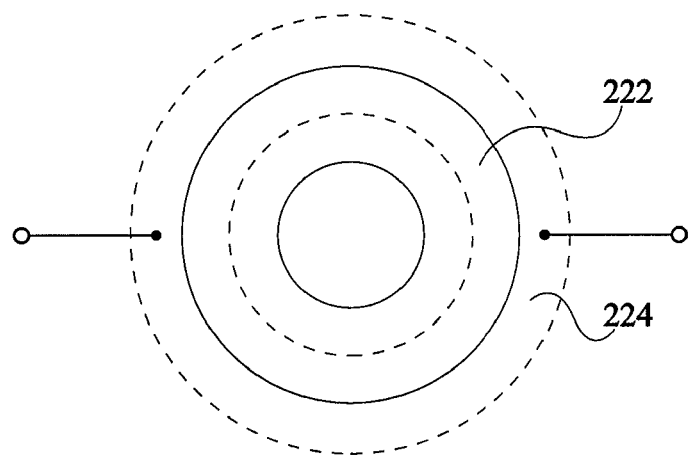

FIG. 2B illustrates in plan view conductive ring 222, delimited by solid circles, and conductive ring 224 delimited by dashed circles. As illustrated, in this embodiment, the conductive rings are annular in shape, and overlap so that an annular region contacts between the two rings when the lens barrel 202 is at the bottom of the housing 212.

The forces exerted by springs 216 and 218 are generally very low, for example in the region of 10 mN. Thus, to ensure a good connection between rings 222 and 224, a contact area having a relatively small area can be chosen so as to provide greater pressure between the conductive rings. A contact region which is annular in shape is preferable, to ensure that when the two conductive rings contact the lens barrel is not titled within the housing. Alternatively other contact surfaces are possible, preferably providing at least three contact points evenly distributed such that the lens barrel rests without being titled.

In some embodiments the voltage detector 226 performs a filtering function to filter out bouncing of the contacts that may be present. Additionally, control of the coil is preferably performed such that bouncing is reduced.

Figure 3A:
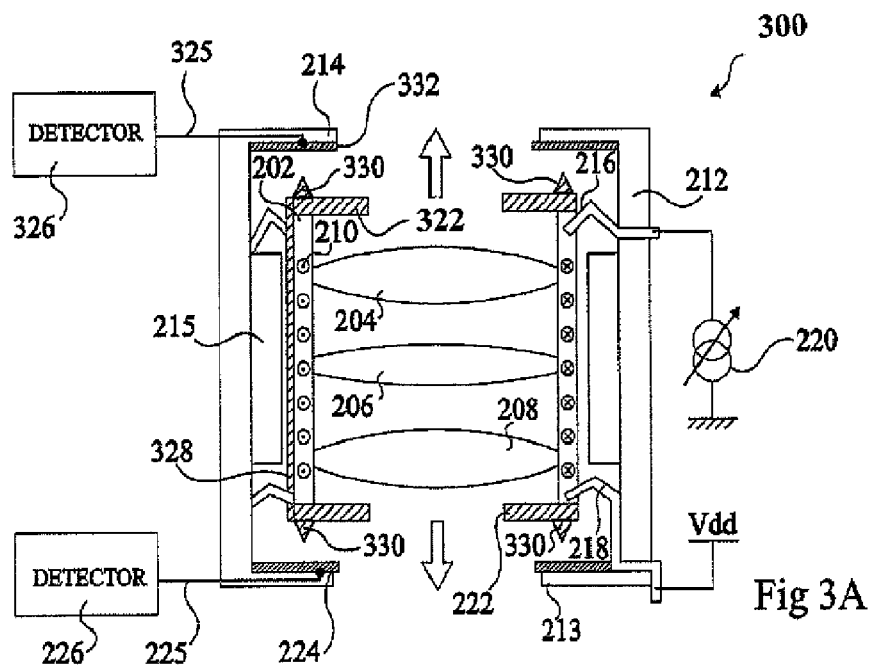
FIGS. 3A and 3B illustrate schematically in cross-section and plan view respectively a mobile lens unit according to a further embodiment.

FIG. 3A illustrates an alternative embodiment of a mobile lens unit 300 comprising many common features with the embodiment of FIG. 2A, and these have been given like reference numerals in FIG. 3A and will not be described again in detail. In this embodiment, the lens barrel 202 further comprises a second conductive ring 322 formed at the top of the lens barrel, and coupled to ring 222 via a conducting track 328, running up the side of the lens barrel. The housing 212 further comprises a conductive ring 332 formed on the underside of rim 214 at the top of the housing 212. Furthermore, in this embodiment, conductive rings 222 and 322 connected to the lens barrel 202 comprise conductive spikes 330, which are designed to make contact with the conductive rings 224 and 332 on the housing 212. By providing spikes 330, more pressure can be applied, and a better contact can be made.

In the embodiment of FIG. 3A, both conductive rings 224 and 332 of the housing 212 are connected to voltage detectors, ring 224 to the detector 226 via a conductor 225, and ring 332 to a detector 326 through a conductor 325, for detecting when the voltage of the variable voltage source 220 is present. A voltage will be present at conductive ring 332 when the lens barrel 202 is at its furthest displacement, and contacts with the upper rim 214 of the housing 212.

With reference again to FIG. 5, the embodiment of FIG. 3A allows not only the initial start current to be determined, but also allows the current that brings the lens barrel to its maximum displacement at the top of the housing 212 to be determined. In this case, whereas the voltage detector connected to ring 224 determines when a voltage ceases to be present, the voltage detector connected to ring 332 preferably detects when a voltage is present at ring 332. It will be apparent to those skilled in the art that in alternative embodiments, one can determine at either ring when contact is made or broken. These changes indicate that the lens barrel is either arriving or departing, and in either case this moment corresponds to an end of the straight portions of the curves in FIG. 5.

In operation, upon turning on a device comprising the housing of FIG. 3A, and for example before any auto focus operation, the lens barrel can be moved from the bottom of the housing to the top of the housing, such that the start current to move the lens barrel and the current of a maximum displacement of the lens barrel are known. From these two values, and by knowing the distance between the top and bottom of the housing, the gradient of the curve in FIG. 5 can be determined, and used to give value $R_{I/S}$ in formula (1) above. In particular, the lens displacement per Amp of current can be determined. This then allows the correct current to be immediately applied to the coil 210 to obtain a desired lens position, by calculating the required current as explained above with reference to formula (1).

The same operation can be repeated, for example at predetermined time intervals, in case the orientation of the lens barrel with respect to gravity changes. Advantageously, contact between the spikes 330 and the conductive rings 224 and 332 can be improved by slamming the lens barrel against the bottom and upper rims of the housing 212, causing a greater force between the spikes 330 and the respective rings 224, 332.

Figure 3B:
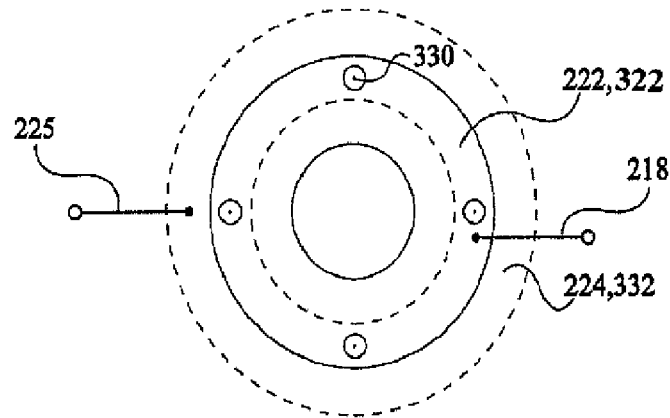

FIG. 3B illustrates, in plan view, the conductive rings 222 and 222 delimited by solid circles and conductive rings 224 and 332 delimited by dashed circles. As illustrated, both of these rings are circular in this embodiment, and in this embodiment four spikes 330 are provided at even spaces around the rings. Preferably at least three spikes are provided, or a greater number of spikes could be provided.

Figure 4:
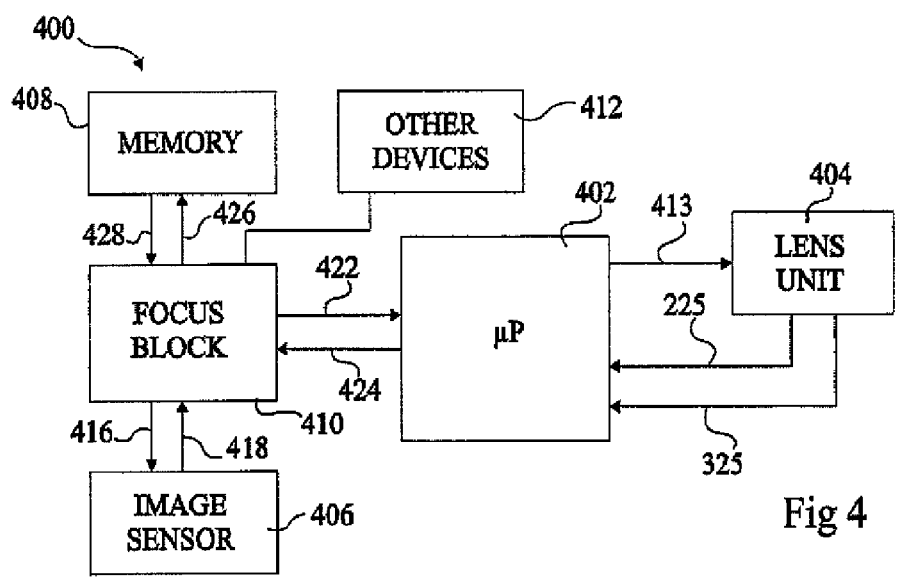
FIG. 4 illustrates schematically a device according to an embodiment.

FIG. 4 illustrates schematically components of a device 400. Device 400 is, for example, a digital camera, mobile telephone, PDA (personal digital assistant), endoscope or the like. Device 400 comprises a microprocessor 402, lens unit 404, image sensor 406, memory 408, auto-focus block 410 and other devices 412, which are, for example, a display for displaying images, an input device such as a keypad, and/or alternative devices. Line 413 is provided from the microprocessor to the lens unit, lines 416 and 418 are provided from the auto-focus block 410 to and from the image sensor 406, and lines 422 and 424 are provided from the microprocessor 402 to and from the auto-focus block 410. Lines 426 and 428 are provided from the auto-focus block 410 to and from the memory block 408.

The lens unit 404 may correspond to one of the embodiments shown in FIG. 2A or 3A. The microprocessor 402 provides a signal on line 413 to the lens unit 404 indicating the current to be applied to the coil of the lens barrel, to cause its displacement. It receives, on line 225 from the lens unit 404, the signal from ring 224, and in the case of FIG. 3A also the signal 325 from ring 332. The microprocessor 402 is able to control the lens barrel of the lens unit and determine the current values required for starting the movement of the lens barrel, and/or for generating the maximum displacement of the lens barrel. From these values, the microprocessor 402 can calculate the required current to provide a signal to the lens unit for a given positioning of the fixed lenses, for example using formula (1) above.

The image sensor 406 receives an image from the lens unit 404 and transforms it to an electrical representation 420 that is sent to an auto-focus block 410. The auto-focus block 410 determines the required focusing of the image. It could be the baseband processor of a mobile telephone, image processor or a dedicated auto-focus processor. Auto-focus block 410, for example, stores this image in memory 408 and/or displays it on a display. In some embodiments, the auto-focus block also determines the sharpness of the image, and generates a focus control signal on line 422 to the microprocessor 402 based on this signal. To react to different environments the auto-block 410 may control the image sensor 406 through line 416.

The auto-focus block 410 commands microprocessor 402 to move the lens barrel of the lens unit 404 to a specified position based on factors such as the determined focusing of the image or the mode of operation, for example in the case that a macro or landscape mode has been selected by a user. The microprocessor 402 performs necessary control of the lens unit 404 including above described methods for detecting the lens movement and for example provides status information to the auto-focus block 410 via line 424.

While the microprocessor 402 has been illustrated as a separate entity, it could be incorporated in the auto-focus block 410 or in the image sensor 406, for example to save space.

Advantageously, by detecting when electrical contact is made between the lens barrel and the housing, the current required to initially displace the lens barrel can be determined, with minimal circuitry. All that will be required is a detector for example provided by a microprocessor, to detect, from the voltage level, when the lens barrel is no longer in contact with the housing. The particular circuitry required to perform these functions will be within the capabilities of one skilled in the art. The conductors are preferably made of materials that make good electrical contact when only a low force is applied between them, such as copper, or a material coated with a gold, platinum, palladium or similar alloy plating.

Whilst a number of specific embodiments have been described, it will be apparent to those skilled in the art that there are numerous modifications and alterations that could be applied.

For example, whilst in the embodiment of FIG. 2A the start of the movement of the lens barrel is detected, in alternative embodiments, the current required to provide a maximum displacement of the lens barrel could be determined, and this could then be used to calculate the current required to displace the lens to the given position. In other words, with reference to FIG. 5, instead of determining the bottom point of the current/displacement curve, the upper point of the curve alone could be determined.

Whilst embodiments have been described comprising a VCM, it will be apparent to those skilled in the art that the principles described herein could be applied to alternative lens motors in which the displacement of a lens barrel is proportional to a current or voltage applied to the motor. For example, the principles could be applied to motors using SMAs (shape memory alloys). Whilst in the example given in the figures the VCM is controlled by a variable current source, it will be apparent to those skilled in the art that in alternative embodiments the VCM could be controlled by a variable voltage source connected across the two springs 216, 218.

Whilst in the embodiment of FIG. 3A spikes 330 have been provided on the rings 222 and 322 attached to the lens barrel, in alternative embodiments no spikes could be provided here, and instead spikes could be provided on the rings 224 and 332 attached to the housing 212.

Having thus described at least one illustrative embodiment of the invention, various alterations, modifications, and improvements will readily occur to those skilled in the art. Such alterations, modifications, and improvements are intended to be within the spirit and scope of the invention. Accordingly, the foregoing description is by way of example only and is not intended as limiting. The invention is limited only as defined in the following claims and the equivalents thereto.

What is claimed is:

1. A lens unit comprising:
   a lens barrel for receiving at least one lens;
   a housing for receiving the lens barrel;
   a motor arranged to displace the lens barrel between an initial position and a maximum displacement, wherein the displacement of a lens barrel is proportional to the level of an electrical signal applied to the motor when the electrical signal is between first and second levels, the first level corresponding to a level for starting movement of the lens barrel from the initial position and the second level corresponding to a level for bringing the lens barrel to the maximum displacement;
   a first conductor fixed to the lens barrel and arranged to make electrical contact with a second conductor fixed to the housing when said lens barrel is at one of said initial position and said maximum displacement;
   the first and second conductor each having a conductive surface; and
   a processor arranged to detect a change in the contact situation between the first and second conductive surfaces, to determine one of said first and second levels based on level of the electrical signal at the time of the change and to generate, based on said determined level, a level of said electrical signal for a desired displacement.

2. The lens unit of claim 1, wherein said first conductor is positioned to make contact with said second conductor when said lens barrel is at said initial position and said processor is arranged to determine said first level of said electrical signal when the contact between said first and second conductors is broken.

3. The lens unit of claim 1, further comprising a third conductor fixed to the lens barrel and arranged to make electrical contact with a fourth conductor fixed to the housing when said lens barrel is at said maximum displacement, and wherein said processor is arranged to determine a second level of the electrical signal applied to said motor when contact is made between said third and fourth conductors, and to adjust said second level to generate said electrical signal to be applied to said motor.

4. The lens unit of claim 1, wherein at least one of said first and second conductors comprises a pointed surface for making contact with the other of said first and second conductors.

5. The lens unit of claim 1, wherein said motor comprises a conducting coil and a magnet, and said lens unit further comprises first and second springs connected to said lens barrel and arranged to hold said lens barrel at said initial position when no current flows in said coil, each of said first and second springs electrically connected to said coil for supplying a current, and one of said first and second springs connected to said first conductor.

6. The lens unit of claim 1, wherein said level of said electrical signal is a current level.

7. A device comprising the lens unit of claim 1, an image sensor for capturing images received via said lens unit, a memory for storing images captured by said image sensor and an auto-focus block for generating a focus control signal, wherein said processor is arranged to provide a drive signal to said lens unit based on said focus control signal.

8. The device of claim 7, wherein the processor is integrated in at least one of:

the auto-focus block; and the image sensor.

9. The device of claim 7, comprising a non-volatile memory storing characteristic data relating to the lens unit, said data for use by said processor in controlling said lens unit.

10. A mobile telephone comprising the device of claim 7.

11. A digital camera comprising the device of claim 7.

12. A personal digital assistant comprising the device of claim 7.

13. A method of determining a level of an electrical signal to be applied to a motor to move a lens barrel to a certain position, wherein the displacement of the lens barrel is proportional to the level of an electrical signal applied to the motor when the electrical signal is between first and second levels, the first level corresponding to a level for starting movement of the lens barrel from an initial position and the second level corresponding to a level for bringing the lens barrel to a maximum displacement, and wherein a first conductor is fixed to the lens barrel and arranged to make electrical contact with a second conductor fixed to the housing when said lens barrel is at one of the initial position and the maximum displacement the method comprising:

increasing the level of the electrical signal applied to said motor;

detecting a change in said contact situation between said first and second conductors and determining one of the first and second levels based on the level of the electrical signal at the time of the change; and generating said level of said electrical signal to be applied to said motor for a desired displacement based on the determined level of said electrical signal.

14. The method of claim 13, wherein said first and second conductors are arranged to make electrical contact when said lens barrel is at said initial position, and wherein said change in said contact situation is a breaking of the connection between said first and second conductors.

* * * * *

UNITED STATES PATENT AND TRADEMARK OFFICE
CERTIFICATE OF CORRECTION

PATENT NO. : 7,679,849 B2  Page 1 of 1
APPLICATION NO. : 12/129703
DATED : March 16, 2010
INVENTOR(S) : Tarek Lule It is certified that error appears in the above-identified patent and that said Letters Patent is hereby corrected as shown below:

Col. 6, line 29, should read:
and 322 delimited by solid circles and conductive rings 224

Signed and Sealed this

Fourth Day of May, 2010

David J. Kappos
*Director of the United States Patent and Trademark Office*